United States Patent
Talmor et al.

(10) Patent No.: US 10,320,784 B1
(45) Date of Patent: Jun. 11, 2019

(54) METHODS FOR UTILIZING FINGERPRINTING TO MANAGE NETWORK SECURITY AND DEVICES THEREOF

(71) Applicant: F5 Networks, Inc., Seattle, WA (US)

(72) Inventors: Ron Talmor, Sunnyvale, CA (US); Yaniv Shemesh, Seatte, WA (US)

(73) Assignee: F5 Networks, Inc., Seattle, WA (US)

( * ) Notice: Subject to any disclaimer, the term of this patent is extended or adjusted under 35 U.S.C. 154(b) by 125 days.

(21) Appl. No.: 14/939,697

(22) Filed: Nov. 12, 2015

Related U.S. Application Data (60) Provisional application No. 62/078,843, filed on Nov. 12, 2014.

(51) Int. Cl.
*H04L 29/06* (2006.01)

(52) U.S. Cl.
CPC ........ *H04L 63/0876* (2013.01); *H04L 63/101* (2013.01); *H04L 63/1425* (2013.01); *H04L 63/1433* (2013.01)

(58) Field of Classification Search
CPC . H04L 63/14; H04L 63/1408; H04L 63/1425; H04L 63/1433; H04L 63/0876
See application file for complete search history.

(56) References Cited

U.S. PATENT DOCUMENTS

| | | | | |
|---|---|---|---|---|
| 7,515,576 B2* | 4/2009 | Montenegro | ......... | H04L 63/107 370/328 |
| 7,841,002 B2* | 11/2010 | Golobrodsky | ...... | H04M 3/2218 726/22 |
| 8,151,327 B2* | 4/2012 | Eisen | .................. | H04L 63/0876 726/22 |
| 8,713,704 B2* | 4/2014 | Davis | .................... | H04L 9/3231 713/166 |
| 8,844,041 B1* | 9/2014 | Kienzle | .................. | H04L 41/12 709/224 |
| 2014/0283061 A1* | 9/2014 | Quinlan | .............. | H04L 63/1408 726/23 |

(Continued)

OTHER PUBLICATIONS

5 Networks, Inc., "BIG-IP ASM", Release Notes, Apr. 12, 2016, pp. 1-51, V 11.4, F5 Networks, Inc.

(Continued)

*Primary Examiner* — Zachary A. Davis
(74) *Attorney, Agent, or Firm* — Pepper Hamilton LLP (57) ABSTRACT

Methods, non-transitory computer readable media, and security management computing devices are disclosed herein. With this technology, an executable code is sent to a client. The executable code is configured to obtain information associated with the client, assemble the information into a fingerprint, and return the fingerprint. A determination is made when the fingerprint is returned from the client. When the determining indicates that the fingerprint has been returned, a determination is made when a record of a reputation database matches the fingerprint. Historical data in the record is updated to include information associated with the request and an action is initiated based on the historical data or other data included in the record. The action includes blocking an access request or providing access to a requested resource to the client, when the determining indicates that the record of the reputation database matches the fingerprint.

24 Claims, 5 Drawing Sheets

(56) References Cited

U.S. PATENT DOCUMENTS

2015/0101050 A1* 4/2015 Nielson ............... G06F 21/566
726/23

OTHER PUBLICATIONS

F5 Networks, Inc., "BIG-IP ASM", Release Notes, Apr. 12, 2016, pp. 1-51, V 11.4, F5 Networks, Inc.

F5 Networks, Inc., "BIG-IP® TMOS®: Implementations", Manual, May 5, 2015, pp. 1-234, V 11.4, F5 Networks, Inc.

F5 Networks, Inc., "BIG-IP® Application Security Manager™: Implementations," May 15, 2013, pp. 1-200, version 11.4, F5 Networks Inc.

F5 Networks, Inc., "Configuration Guide for BIG-IP® Application Security Manager™," May 15, 2013, pp. 1-373, version 11.4, F5 Networks, Inc.

F5 Networks, Inc., "Release Notes: Big-IP ASM 11.4.1," Jul. 31, 2015, pp. 1-69, version 11.4.1, F5 Networks, Inc.

F5 Networks, Inc., "BIG-IP® Application Security Manager™: Getting Started", Manual, May 15, 2013, V 11.4, pp. 1-70, F5 Networks, Inc.

F5 Networks, Inc., "BIG-IP® Analytics: Implementations", Manual, May 15, 2013, pp. 1-46, V 11.4, F5 Networks, Inc.

F5 Networks, Inc., "BIG-IP® Application Security Manager: Implementations™", Manual, May 15, 2013, pp. 1-200, V 11.4, F5 Networks, Inc.

F5 Networks, Inc., "BIG-IP® Systems: DOS Protection and Protocol Firewall Implementations", Manual, May 15, 2013, pp. 1-64, V 11.4, F5 Networks, Inc.

F5 Networks, Inc., "BIG-IP® TMOS®: Concepts", Manual, May 15, 2013, V 11.4, pp. 1-140, F5 Networks, Inc.

F5 Networks, Inc., "Configuration Guide for BIG-IP® Application Security Manager™", Manual, May 15, 2013, V 11.4, pp. 1-373, F5 Networks, Inc.

F5 Networks, Inc., "F5 Big-IP TMOS: Operations Guide", Manual, Oct. 3, 2017 (original publication date: Mar. 5, 2015), pp. 1-278, F5 Networks, Inc.

\* cited by examiner

METHODS FOR UTILIZING FINGERPRINTING TO MANAGE NETWORK SECURITY AND DEVICES THEREOF

This application claims the benefit of U.S. Provisional Patent Application Ser. No. 62/078,843, filed on Nov. 12, 2014, which is hereby incorporated by reference in its entirety.

FIELD

This technology relates to methods and devices for improving computer network security.

BACKGROUND

Network security is increasingly important as more sensitive data is exchanged online. While nefarious activity can be identified based on an Internet Protocol (IP) address associated with a client device from which the activity originated, IP addresses do not provide sufficient granularity for effective network security management. More specifically, bad actors can use a variety of techniques that render IP address filtering ineffective, including frequent changing of IP addresses, IP address spoofing, and operating behind hidden proxies, for example. Accordingly, current methods for identifying bad actors originating nefarious network activity are not robust and are insufficient to protect server devices and associated web applications and other resources.

SUMMARY

A method for improved network security management using fingerprinting, executable by one or more security management computing devices with at least one processor executing the method is disclosed. The method includes steps to send, by a first processor on the one or more security management computing devices and prior to providing access to a client device to a requested resource, executable code to the client device. The executable code is configured to, when executed by the client device, obtain information associated with the client device, assemble the information into the fingerprint, and return the fingerprint in response. A determination is made, by a second processor on the one or more security management computing devices, when the fingerprint is returned from the client device. Another determination is made, by a third processor on the one or more security management computing devices, when a record of a reputation database matches the fingerprint, when the determining indicates that the fingerprint has been returned from the client device. Historical data in the record is updated, by a fourth processor on the one or more security management computing devices, to include information associated with the request and an action is initiated based on the historical data or other data included in the record, when the determining indicates that the record of the reputation database matches the fingerprint. The action includes blocking the access request or providing access to the requested resource to the client device.

A non-transitory computer readable medium having stored thereon instructions for improved network security management using fingerprinting including executable code, which when executed by one or more processors, causes the processors to perform steps is disclosed. The steps include sending, prior to providing access to a client device to a requested resource, executable code to the client device. The executable code is configured to, when executed by the client device, obtain information associated with the client device, assemble the information into the fingerprint, and return the fingerprint in response. A determination is made when the fingerprint is returned from the client device. Another determination is made when a record of a reputation database matches the fingerprint, when the determining indicates that the fingerprint has been returned from the client device. Historical data in the record is updated to include information associated with the request and an action is initiated based on the historical data or other data included in the record, when the determining indicates that the record of the reputation database matches the fingerprint. The action includes blocking the access request or providing access to the requested resource to the client device.

Security management computing devices, including memory comprising programmed instructions stored in the memory and one or more processors configured to be capable of executing the programmed instructions stored in the memory to perform steps, are disclosed. The steps include sending, prior to providing access to a client device to a requested resource, executable code to the client device. The executable code is configured to, when executed by the client device, obtain information associated with the client device, assemble the information into the fingerprint, and return the fingerprint in response. A determination is made when the fingerprint is returned from the client device. Another determination is made when a record of a reputation database matches the fingerprint, when the determining indicates that the fingerprint has been returned from the client device. Historical data in the record is updated to include information associated with the request and an action is initiated based on the historical data or other data included in the record, when the determining indicates that the record of the reputation database matches the fingerprint. The action includes blocking the access request or providing access to the requested resource to the client device.

A method for improved network security management using fingerprinting includes sending, by a security management computing device and prior to providing access to a client device to a requested resource, executable code to the client device. The executable code is configured to, when executed by the client device, obtain information associated with the client device, assemble the information into the fingerprint, and return the fingerprint in response. A determination is made, by the security management computing device, when the fingerprint is returned from the client device. Another determination is made, by the security management computing device, when a record of a reputation database matches the fingerprint, when the determining indicates that the fingerprint has been returned from the client device. Historical data in the record is updated, by the security management computing device, to include information associated with the request and an action is initiated based on the historical data or other data included in the record, when the determining indicates that the record of the reputation database matches the fingerprint. The action includes blocking the access request or providing access to the requested resource to the client device.

This technology has a number of associated advantages including providing methods, non-transitory computer readable media, and security management computing devices that more effectively provide network security and identify nefarious network traffic and associated sources. With this technology, a reputation database can be populated, optionally by a number of different security management computing devices, based on fingerprinting. By identifying sources of network traffic based on fingerprints, nefarious activities can be prevented relatively effectively as compared to utilizing IP address filtering. Accordingly, the security management computing devices can more accurately identify sources of, and effectively prevent, nefarious activities, as well as reduce false positives.

DETAILED DESCRIPTION

Figure 1:
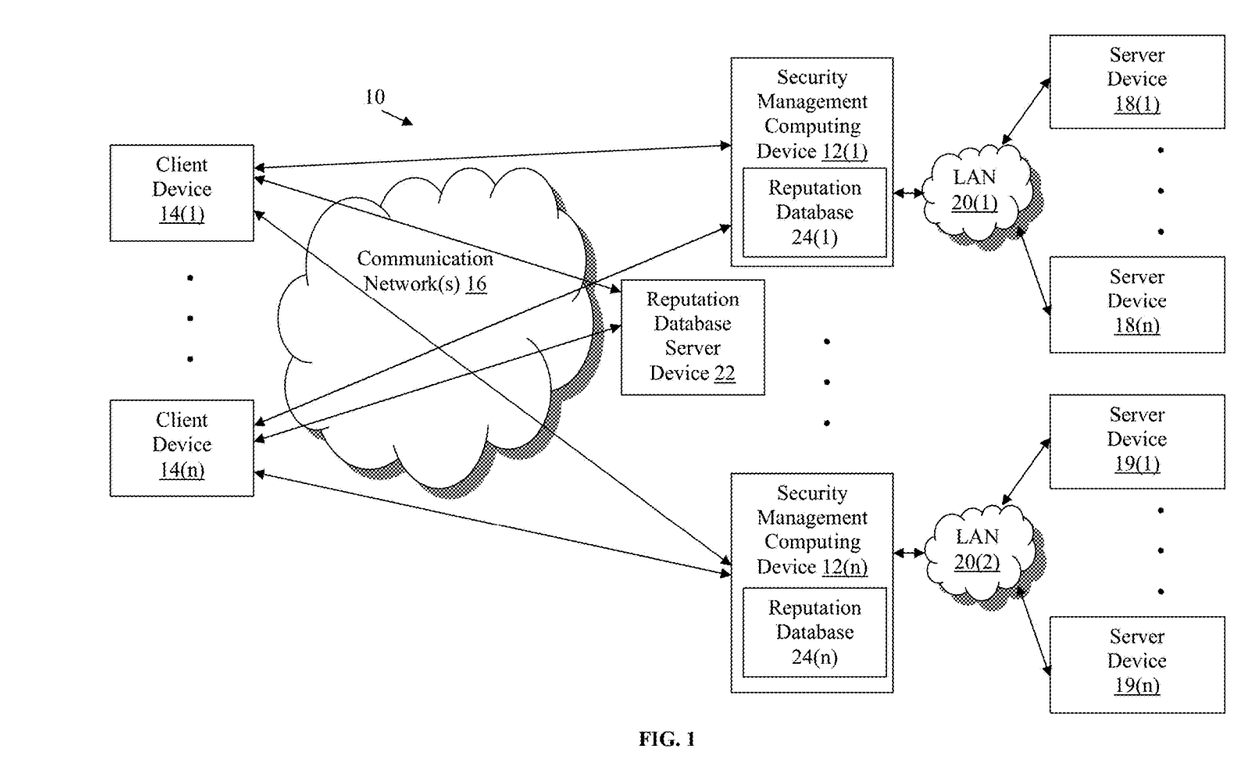
FIG. 1 is a block diagram of a network environment with examples of a plurality of security management computing device.

Referring to FIG. 1, a block diagram of an exemplary network environment 10 including a plurality of exemplary security management computing devices 12(1)-12(n) is illustrated. In this example, the security management computing devices 12(1)-12(n) are coupled to a plurality of client devices 14(1)-14(n) by communication network(s) 16 and a plurality of server devices 18(1)-18(n) and 19(1)-19(n) through local area networks (LANs) 20(1) and 20(2), although the security management computing devices 12(1)-12(n), client devices 14(1)-14(n), and server devices 18(1)-18(n) may be coupled together via other topologies.

Figure 2:
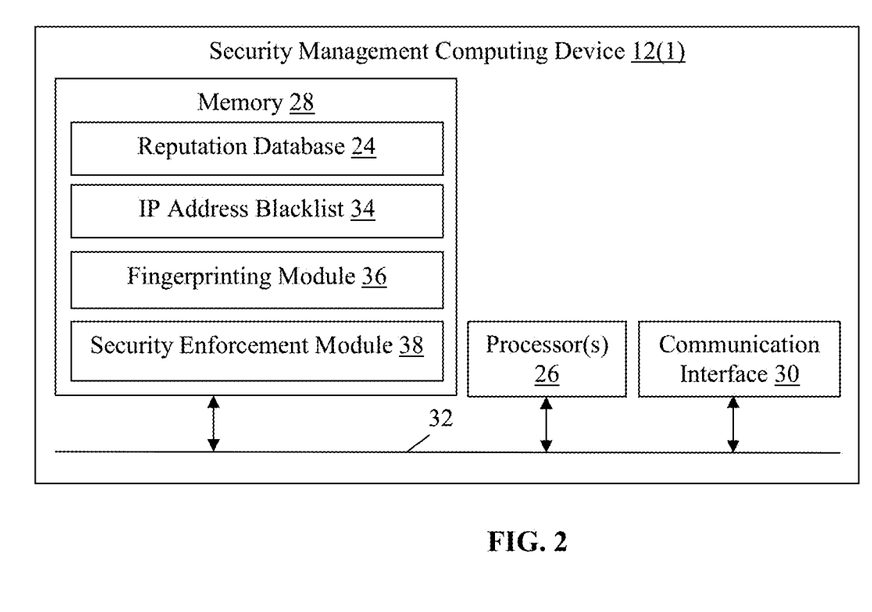
FIG. 2 is a block diagram of one of the exemplary security management computing devices shown in FIG. 1.

In this particular example, the security management computing devices 12(1)-12(n) and client devices 14(1)-14(n) are further coupled to an optional reputation database server device 22 by the communication network(s) 16, although other configurations may be used, such as one or more of the security management computing devices 12(1)-12(n) storing a corresponding separate one of the reputation databases 24(1)-24(n) by way of example only and as described and illustrated in more detail later with reference to security management computing devices 12(1) illustrated in FIG. 2. The network environment 10 may also include other network devices, such as one or more routers and/or switches for example, that are well known in the art and will not therefore be described herein. This technology provides a number of advantages including methods, non-transitory computer readable media, and devices that utilize fingerprinting across various areas of security concern to populate a more enhanced reputation database, which is used to facilitate more effective network security management.

Referring to FIGS. 1-2, each of the security management computing devices 12(1)-12(n) may perform any type and/or number of other functions and/or operations in addition to managing network security, such as optionally facilitating access to web applications or optimizing, securing, and/or load balancing the network traffic exchanged between the client devices 14(1)-14(n) and the server devices 18(1)-18(n), for example. For ease of illustration, only security management computing device 12(1) is illustrated in FIG. 2 and in this example the other security management computing devices 12(2)-12(n) have the same structure and operation, although one or more of the security management computing devices 12(1)-12(n) could have other systems, devices, components, and/or other elements in other configurations. In this example, each of the security management computing devices 12(1)-12(n) includes one or more processor(s) 26, a memory 28, and a communication interface 30, which are coupled together by a bus 32 or other communication link, although one or more of the security management computing devices 12(1)-12(n) may include other types and numbers of elements in other configurations.

The processor(s) 26 of each of the security management computing devices 12(1)-12(n) may execute programmed instructions for any number of the functions identified above and/or described herein for utilizing fingerprinting to improve network security and, optionally, managing network traffic, managing access to network resources, and/or optimizing service of content requests, for example. The processor(s) 26 of each of the security management computing devices 12(1)-12(n) may include one or more central processing units and/or general purpose processors with one or more processing cores, for example.

The memory 28 of each of the security management computing devices 12(1)-12(n) stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk drives, solid state drives, or other computer readable medium which is read from and written to by a magnetic, optical, or other reading and writing system that is coupled to the processor(s) 26, can be used for the memory 28.

In this example, the memory 28 further includes an optional IP address blacklist 34, a fingerprinting module 36, and a security enforcement module 38, although other modules, programs, or applications can also be stored in the memory 28. Additionally, in the example illustrated in FIG. 2, the security management computing device 12(1)-12(n) includes the reputation database 24, although the reputation database 24 also can be external to one or more of the security management devices 12(1)-12(n) (e.g., in a cloud and/or stored on the reputation database server 22), as illustrated for example in FIG. 1.

The IP address blacklist 34 includes a list of IP addresses to be blocked and can be used as an initial filter effective to prevent some types of nefarious activities from some of the client devices 14(1)-14(n), as described and illustrated in more detail later. The fingerprinting module 36 facilitates the requesting and receiving of a fingerprint from one of the client devices 14(1)-14(n) requesting access to resources provided by the server devices 18(1)-18(n), as described and illustrated in more detail later. The security enforcement module 38 communicates with the reputation database 24 using fingerprints obtained from the fingerprinting module 36 to make decisions regarding whether to allow or block one or more of the client devices 14(1)-14(n) attempting to access resources provided by the server devices 18(1)-18(n), also as described and illustrated in more detail later.

The communication interface 30 of each of the security management computing devices 12(1)-12(n) operatively couples and communicates between the security management computing devices 12(1)-12(n), reputation database server device 22, client devices 14(1)-14(n), and server devices 18(1)-18(n) and 19(1)-19(n), which are all coupled together by the LANs 20(1) and 20(2) and the communication network(s) 16, although other types and numbers of communication networks or systems with other types and numbers of connections and configurations to other devices and elements could also be used. By way of example only, the LANs 20(1) and 20(2) and the communication network(s) 16 can use TCP/IP over Ethernet and industry-standard protocols, although other types and numbers of communication networks can be used. The communication network(s) 16 may comprise any wide area network (e.g., Internet), although any other type of traffic network topology may be used.

Each of the client devices **14(1)-14(*n*) and server devices 18(1)-18(*n*) and 19(1)-19(*n*) includes a processor, a memory, and a communication interface, which are coupled together by a bus or other communication link, although other numbers and types of network devices could be used. Each of the client devices 14(1)-14(*n*) may further include an input device and a display device and may run interface applications, such as Web browsers or plug-ins, that may provide an interface to make requests for access to web applications or other content and receive content hosted by the server devices 18(1)-18(*n*) via the communication network(s) 16 and one of the LANs 20(1) or 20(2)** in response.

Each of the server devices **18(1)-18(*n*) and 19(1)-19(*n*) may provide network resources in response to requests directed toward applications or content hosted by the server devices 18(1)-18(*n*) from the client devices 14(1)-14(*n*) via the communication network(s) 16 and one of the LANs 20(1) or 20(2) according to the HTTP protocol or the Common Internet File System (CIFS) or Network File System (NFS) protocol, for example. The server devices 18(1)-18(*n*) may be hardware or software or may represent a system with multiple server devices in a server device pool, which may include internal or external networks. Various network processing applications, such as CIFS applications, NFS applications, HTTP Web Server device applications, and/or FTP applications, may be operating on the server devices 18(1)-18(*n*) and transmitting data in response to requests received from the client devices 14(1)-14(*n*)**.

The reputation database server device 22 can host a SQL database, for example, although other types of databases can be used. The reputation database server device 22 stores historical information associated with each of a plurality of fingerprints associated with one or more of the client devices **14(1)-14(*n*) that allows each of the security management computing devices 12(1)-12(*n*) to make decisions regarding whether to allow access requests from one or more of client devices 14(1)-14(*n*) matching the stored fingerprints. The reputation database server device 22 in the example illustrated in FIG. 1 can be populated by different types of security management computing devices 12(1)-12(*n*) configured to identify and prevent different types of anomalous or nefarious network activity and/or the same type of security management computing devices 12(1)-12(*n*)** operating in different local networks, for example.

Although the exemplary network environment 10 with the security management computing devices **12(1)-12(*n*), optional reputation database server device 22, client devices 14(1)-14(*n*), server devices 18(1)-18(*n*) and 19(1)-19(*n*), LANs 20(1) and 20(2), and communication network(s) 16** are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
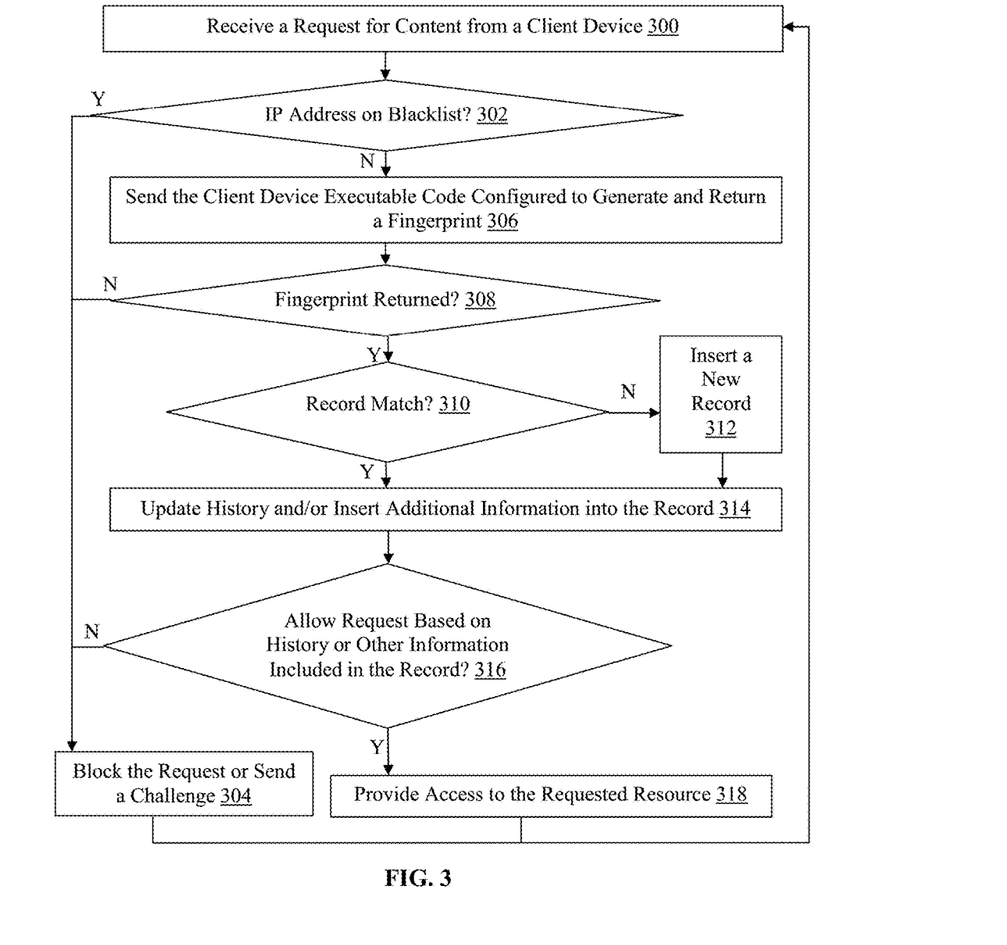
FIG. 3 is a flowchart of an exemplary method for processing requests received from client devices to improve network security.

Exemplary methods for utilizing optimized fingerprinting techniques to manage network security will now be described with reference to FIGS. 1-5. Referring more specifically to FIG. 3, a method for processing requests received from the client devices **14(1)-14(*n*) to improve network security is illustrated. In step 300 in this particular example, one of the security management computing devices 12(1)-12(*n*) receives a request from one of the client devices 14(1)-14(*n*). The request can be to access a resource, such as a web page or web application hosted by one of the server devices 18(1)-18(*n*), for example, although other types of requests can also be received in step 300**.

In an optional step 302, the one of the security management computing devices **12(1)-12(*n*) determines whether an IP address associated with the received request from the one of the client devices 14(1)-14(*n*) matches an IP address of the IP address blacklist 34. An IP address is included in the optional IP address blacklist 34 in this example when the one of the security management computing devices 12(1)-12(*n*)** has determined with a relatively high level of confidence that all traffic associated with the IP address is nefarious. However, nefarious activity is not effectively prevented based only on IP address filtering due to well-known techniques, such as IP address spoofing and systematically changing IP addresses from which requests originate. Additionally, IP address filtering has the potential to restrict network traffic that is not nefarious, but that originates behind the same proxy, and associated IP address, as nefarious network traffic.

Accordingly, if the one of the security management computing devices **12(1)-12(*n*) determines in the optional step 302 that the IP address associated with the request received from the client device 14(1)-14(*n*) does match an IP address included on the IP address blacklist 34, then the Yes branch is taken to step 304. In step 304, the one of the security management computing devices 12(1)-12(*n*) blocks the request, responds to the one of the client devices 14(1)-14(*n*) with an indication that the request will not be processed, or responds to the one of the client devices 14(1)-14(*n*)** with a challenge (e.g., a CAPTCHA) requiring successful completion in order for the request to be allowed, for example, although other manners of blocking the access request and other types of responses can also be used.

However, if the one of the security management computing devices 12(1)-12(n) determines in step 302 that the IP address associated with the request received from the one of the client devices 14(1)-14(n) does not match an IP address included on the IP address blacklist 34, then the No branch is taken to step 306. In step 306, the fingerprinting module 36 of the one of the security management computing devices 12(1)-12(n) sends executable code to the one of the client devices 14(1)-14(n). The executable code can be JavaScript, for example, that is configured to, when executed by the one of the client devices 14(1)-14(n), obtain data associated with the one of the client devices 14(1)-14(n), assemble the data into a fingerprint, and return the fingerprint to the one of the security management computing devices 12(1)-12(n).

Optionally, prior to fingerprinting the one of the client devices 14(1)-14(n) by sending the executable code in step 306, the one of the security management computing devices 12(1)-12(n) can determine that there is an increased likelihood that the one of the client devices 14(1)-14(n) is engaging in a nefarious activity requiring that the increased security measure of fingerprinting be implemented. Depending on the type of the one of the security management computing devices 12(1)-12(n), for example, the fingerprint can be used to prevent scraping a website, initiating a denial of service (DOS) attack, repeatedly guessing authentication information, initiating a fraudulent activity, accessing a virtual private network (VPN) without authorization, exploiting a web application, or hijacking a session, for example, as described and illustrated in more detail later, although other types of activity can also be prevented with this technology.

Accordingly, by way of example only, the one of the security management computing devices 12(1)-12(n) can be associated with server devices 18(1)-18(n) hosting a website. In this example, the one of the security management computing devices 12(1)-12(n) can determine that the one of the client devices 14(1)-14(n) is accessing a relatively large number of web pages associated with the web site in a relatively short period of time, and therefore may be engaging in webscraping and should therefore be fingerprinted.

Any other type of potential activity can also be identified by the one of the security management computing devices 12(1)-12(n) prior to initiating the fingerprinting in step 306 in other examples. In yet other examples, all client devices 14(1)-14(n) from which access requests are received by the one of the security management computing devices 12(1)-12(n) are fingerprinted without any initial determination that any of the client devices 14(1)-14(n) are potentially engaging in nefarious activity.

Figure 4:
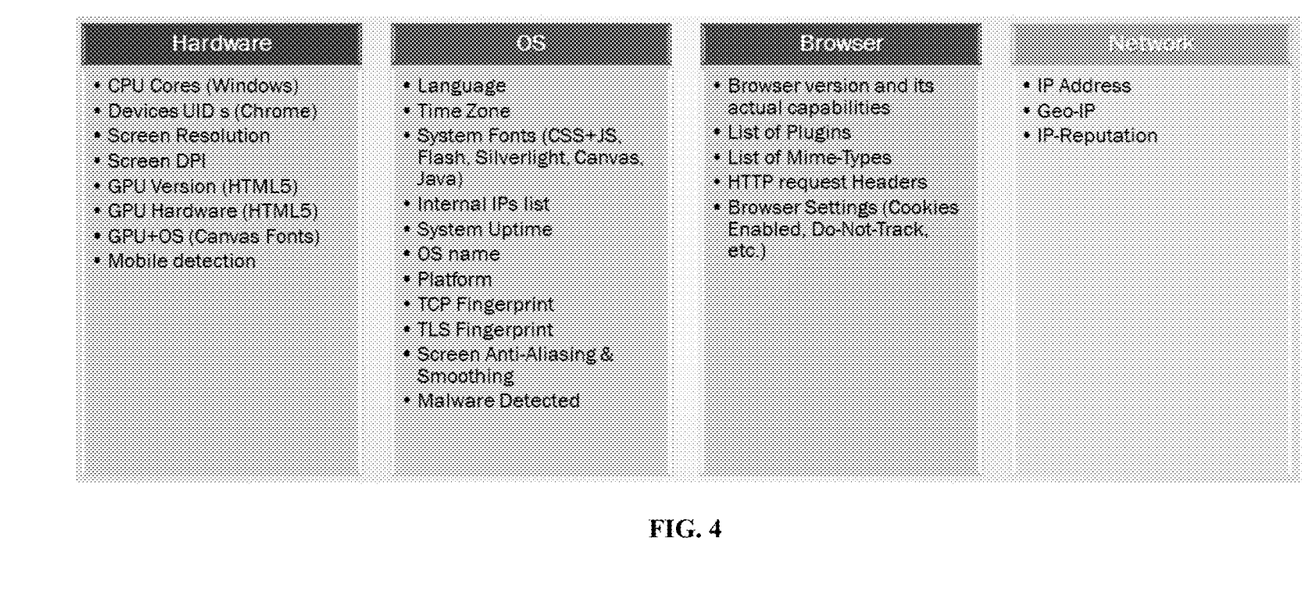
FIG. 4 is a table of exemplary data included in a fingerprint returned as a result of execution of executable code by a client device.

Referring more specifically to FIG. 4, exemplary data included in the fingerprint returned in step 306 as a result of execution of the executable code by the one of the client devices 14(1)-14(n) is illustrated. In this particular example, the data can include information regarding the hardware, operating system, browser, and/or network of the one of the client devices 14(1)-14(n) that, together, has an increased likelihood of uniquely identifying the one of the client devices 14(1)-14(n). Additionally, information obtained by the one of the security management computing devices 12(1)-12(n), such as from header(s) included in the access request, can also be combined to generate the fingerprint.

Referring back to FIG. 3, in step 308, the one of the security management computing devices 12(1)-12(n) determines whether a fingerprint is returned from the one of the client devices 14(1)-14(n). Nefarious activities often originate from ones of the client devices 14(1)-14(n) that are capable of initiating HTTP requests, but not capable of executing code, such as the executable JavaScript code sent in step 306 that is configured to generate the fingerprint. For example, nefarious ones of the client devices 14(1)-14(n) may execute headless web browsers or other client applications that do not have graphical user interfaces and are not configured to display content or execute web pages. Such ones of the client devices 14(1)-14(n) executing applications capable of initiating HTTP requests, but not capable of executing JavaScript code, are inherently nefarious. Accordingly, if the one of the security management computing devices 12(1)-12(n) determines in step 308 that a fingerprint is not returned from the one of the client devices 14(1)-14(n), then the No branch is taken to step 304 and the access request is blocked, as described and illustrated earlier.

However, if the one of the security management computing devices 12(1)-12(n) determines in step 308 that a fingerprint is returned from the one of the client devices 14(1)-14(n), then the Yes branch is taken to step 310. In step 310, the one of the security management computing devices 12(1)-12(n) determines whether there is a record in the reputation database 24 having a fingerprint matching the fingerprint returned from the one of the client devices 14(1)-14(n). In some examples, determining whether the same one of the client devices 14(1)-14(n) is represented by both the received fingerprint and the fingerprint of the record identified in the reputation database 24 requires fuzzy logic based on the entropy and variance of the fingerprint, for example. The entropy is an indication of how unique a fingerprint is and the variance indicates how often a fingerprint changes. Both the entropy and the variance can be determined based on the type and amount of data (e.g., the data indicated in FIG. 4) that is assembled by the executable code in order to generate the fingerprint.

If the one of the security management computing devices 12(1)-12(n) determines that there is not a record in the reputation database 24 having a fingerprint matching the fingerprint returned from the one of the client devices 14(1)-14(n), then the No branch is taken to step 312. In step 312, the one of the security management computing devices 12(1)-12(n) inserts a new record into the reputation database 24 that includes the fingerprint. By inserting the new record, other of the security management computing devices 12(1)-12(n) can retrieve and update the record when a request from one of the client devices 14(1)-14(n) having a matching fingerprint is received, as described and illustrated in more detail later. Optionally, the one of the security management computing devices 12(1)-12(n) can also take a default action, such as allowing the one of the client devices 14(1)-14(n) access to the requested resource or requesting additional authentication information from the one of the client devices 14(1)-14(n), for example, although other actions can also be taken in step 312.

Subsequent to inserting the new record into the reputation database 24, or if the one of the security management computing devices 12(1)-12(n) determines in step 310 that there is a record in the reputation database 24 having a fingerprint matching the fingerprint returned from the one of the client devices 14(1)-14(n) and the Yes branch is taken, then the one of the security management computing devices 12(1)-12(n) proceeds to step 314. In step 314, the one of the security management computing devices 12(1)-12(n) updates historical data and/or inserts additional data into the record of the reputation database 24 having the matching fingerprint.

The historical data can include the time that various requests from the one of the client devices 14(1)-14(n) having the matching fingerprint were received, the number of requests received from the one of the client devices 14(1)-14(n), or the number of requests to access the network resource received from the one of the client devices 14(1)-14(n), for example. The additional information can include information regarding the type of access request or the type of network resource requested, for example, although other types of historical or other data useful for determining whether the one of the client devices 14(1)-14(n) is nefarious can also be included. Optionally, in examples in which the remote reputation database server device 22 is utilized, the one of the security management devices 12(1)-12(n) can instruct the reputation database server device 22 to insert the new record or update an existing record, and send the history or other data, as part of the communication with the reputation database server device 22 to determine whether there is a matching record in step 310.

In step 316, the one of the security management computing devices 12(1)-12(n) determines whether to allow the request received in step 300 based on the historical or other data included in the matching record of the reputation database 24. In examples in which a reputation database server device 22 is utilized, the executable code sent to the one of the client devices 14(1)-14(n) in step 306 can further be configured to, when executed by the one of the client devices 14(1)-14(n), retrieve the historical and other data included in the corresponding record and include the historical and other data (e.g., via cookie(s)) instead of a fingerprint in a response to receiving the executable code.

If the one of the security management computing devices 12(1)-12(n) determines not to allow the request received in step 300, then the No branch is taken from step 316 to step 304 and the access request is blocked or responded to with a challenge, for example, as described and illustrated earlier. However, if the one of the security management computing devices 12(1)-12(n) determines that the access request should be allowed, then the Yes branch is taken to step 318. In step 318, the one of the security management devices 12(1)-12(n) provides the one of the client devices 14(1)-14(n) access to the requested resource, such as by retrieving the resource from one of the server devices 18(1)-18(n) and sending the resource to the one of the client devices 14(1)-14(n), for example.

Referring more specifically to FIG. 1, in examples in which the record database server device 22 is utilized and the record is not newly inserted by the one of the security management computing devices 12(1)-12(n) in step 312, some or all of the historical or other data in the record could have been previously inserted by other of the security management computing devices 12(1)-12(n). Accordingly, the reputation database server device 22 stores a centralized database in this example maintained and accessed by a plurality of different security management computing devices 12(1)-12(n) each configured to at least analyze access requests received from the client devices 14(1)-14(n) to prevent anomalous or nefarious network traffic in addition to other services. Therefore, each of the security management computing devices 12(1)-12(n) in this particular example can advantageously determine whether to allow or block an access request received from one of the client devices 14(1)-14(n) based on historical and other data observed and stored by any number of the security management computing devices 12(1)-12(n) providing any type(s) of service in the network environment 10.

Additionally, each of the security management computing devices 12(1)-12(n) can prevent an increased number of nefarious activities using an enhanced reputation database server device 22 populated by a number of the security management computing devices 12(1)-12(n) according to this technology. Referring to the example described earlier, in addition to confirming that the one of the of the client devices 14(1)-14(n) is engaged in web scraping, the one of the security management computing devices 12(1)-12(n) may be able to determine, using a fingerprint and the reputation database server device 22 with the historical and other data for each record, that another of the client devices 14(1)-14(n) is engaged in a DOS attack or yet another of the client devices 14(1)-14(n) is engaged in session hijacking, for example.

In yet another example, the one of the security management computing devices 12(1)-12(n) is an application security management computing device configured to generate policies for accessing web applications based on network traffic observed over time in a learning process. In this example, in addition to preventing nefarious activity, the one of the security management computing devices 12(1)-12(n) can ignore blocked network traffic when generating or updating the web application access policy and only consider the allowed network traffic, resulting in a more effective web application access policy.

Figure 5:
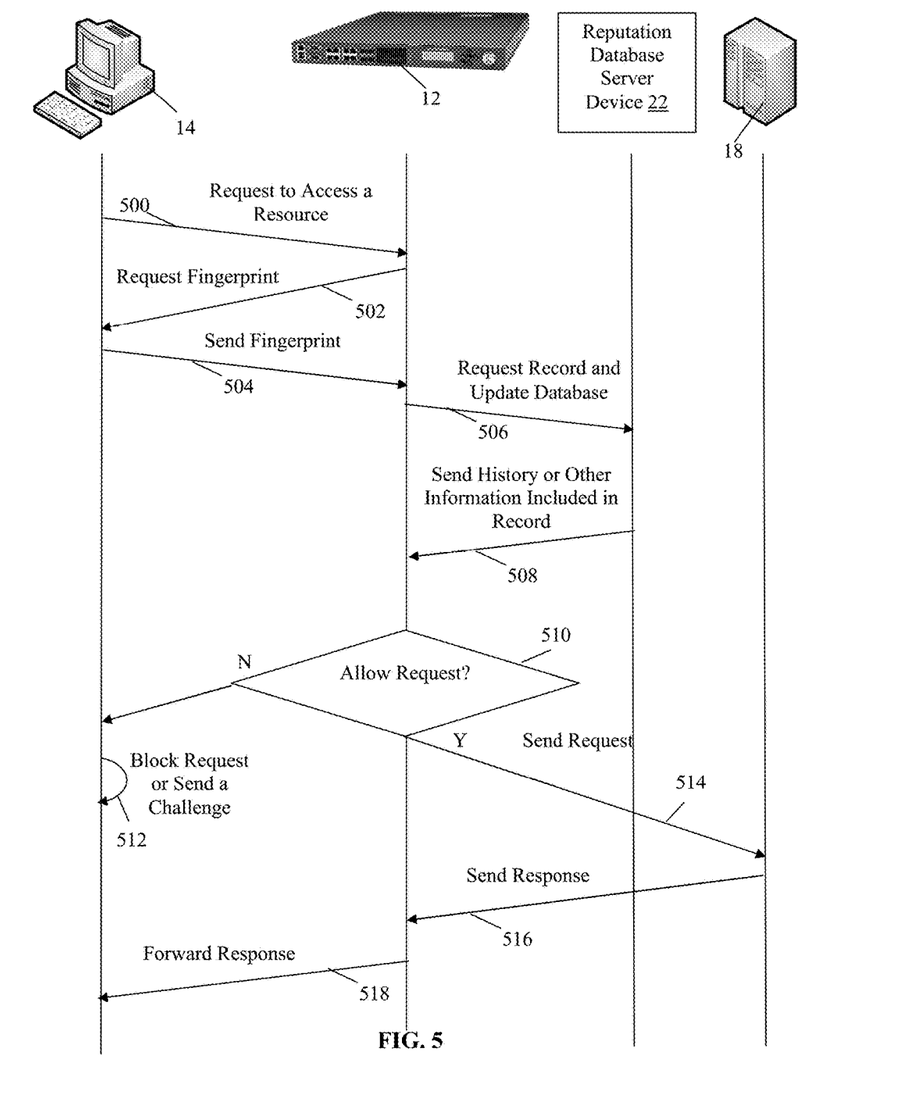
FIG. 5 is a timing diagram illustrating an exemplary method for processing client device requests to improve network security.

Referring more specifically to FIG. 5, a timing diagram of an exemplary method for processing client device requests to improve network security is illustrated. In step 500 in this example, a client device 14 sends a request to access a network request, such as a request for a web page or other content for example, to a security management computing device 12. In step 502, the security management computing device 12 requests a fingerprint from the client device 14 by sending executable code to the client device 14 configured to obtain information and generate the fingerprint. Accordingly, in this example, an optional step of comparing the IP address of the client device 14 to a blacklist is not performed.

In step 504, the client device 14 returns the fingerprint to the security management computing device 12. Accordingly, a web browser executing on the client device 14, for example, can execute the code sent by the security management computing device 12 to obtain and assemble information into the fingerprint and send the generated fingerprint to the security management computing device 12. In step 506, the security management computing device 12 requests a record of the reputation database server device 22 having a fingerprint matching the fingerprint sent from the client device 14 in step 504, and also requests that the reputation database server device 22 update the record to include information associated with the access request.

In this particular example, the reputation database server device 22 includes a record with a matching fingerprint. Accordingly, in step 508, the reputation database server device 22 sends historical and other data included in the matching record to the security management computing device 12. In step 510, the security management computing device 12 determines whether to allow the access request based on the historical and other data received from the reputation database server device 22. If the security management computing device 12 determines that the access request should not be allowed, then the No branch is taken and the access request is blocked or a challenge is sent to the client device 14 in step 512. Optionally, the security management computing device 12 can send an indication to the client device 14 that the request has been blocked.

However, if the security management computing device 12 determines in step 510 that the access request should be allowed, then the Yes branch is taken and the request is sent in this example to the server 18 in step 514, although other actions can be taken subsequent to the security management computing device 12 determining that the request should be allowed. In step 516, the server 18 sends a response to the access request. The response can include a web page or other requested content, for example. In step 518, the security management computing device 12 forwards the response to the client device 14, although other actions and other processing can also occur subsequent to receiving the response from the server 18.

With this technology, a number of different nefarious activities can be identified and prevented using an enhanced reputation database that can be populated by a number of different security management computing devices based on fingerprinting. By identifying client devices based on fingerprints, nefarious activities can be prevented relatively effectively as compared to utilizing IP address filtering. Accordingly, a security management computing device can more effectively prevent an increased number of nefarious activities with this technology, while reducing the impact on permissible network traffic.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for improved network security management using fingerprinting implemented by a network traffic management system comprising one or more security management computing devices, one or more server devices, and one or more client devices, the method comprising:
sending, prior to providing access to a client in response to a request for a resource, executable code to the client, wherein the executable code is configured to obtain information associated with the client, assemble the information into a fingerprint, and return the fingerprint in response;
determining whether the fingerprint has been returned from the client;
when the fingerprint has not been returned from the client, blocking the request;
when the fingerprint has been returned from the client, determining whether a record of a reputation database matches the fingerprint; and
when the record of the reputation database matches the fingerprint:
updating historical data in the record to include information associated with the request; and
initiating an action based on the historical data or other data included in the record, the action comprising blocking the request or providing access to the resource to the client.

2. The method as set forth in claim 1, wherein the fingerprint is used to prevent an activity selected from scraping a website, initiating a denial of service (DOS) attack, repeatedly guessing authentication information, initiating a fraudulent activity, accessing a virtual private network (VPN) without authorization, exploiting a web application, or hijacking a session.

3. The method as set forth in claim 1, wherein the information associated with the request comprises a time at which the request was received from the client or the historical data comprises a number of requests received from the client or a number of requests to access the resource received from the client.

4. The method as set forth in claim 1, further comprising:
determining whether an Internet Protocol (IP) address of the client is included in a blacklist; and
blocking the request prior to requesting the fingerprint, when the IP address of the client is included in the blacklist.

5. The method as set forth in claim 1, wherein the historical data is based on network traffic received from the client by two or more network devices having access to the reputation database.

6. The method as set forth in claim 1, further comprising, when the record of the reputation database does not match the fingerprint:
inserting a new record into the reputation database including the fingerprint;
requesting additional authentication information from the client; and
initiating the action based on a response received from the client to the request for additional authentication information.

7. A non-transitory computer readable medium having stored thereon instructions for improved network security management using fingerprinting, comprising first executable code, which, when executed by one or more processors, causes the processors to:
send, prior to providing access to a client in response to a request for a resource, second executable code to the client, wherein the second executable code is configured to obtain information associated with the client, assemble the information into a fingerprint, and return the fingerprint in response;
determine whether the fingerprint has been returned from the client;
when the fingerprint has not been returned from the client, block the request;
when the fingerprint has been returned from the client, determine whether a record of a reputation database matches the fingerprint; and
when the record of the reputation database matches the fingerprint:
update historical data in the record to include information associated with the request; and
initiate an action based on the historical data or other data included in the record, the action comprising blocking the request or providing access to the resource to the client.

8. The non-transitory computer readable medium as set forth in claim 7,
wherein the fingerprint is used to prevent an activity selected from scraping a website, initiating a denial of service (DOS) attack, repeatedly guessing authentication information, initiating a fraudulent activity, accessing a virtual private network (VPN) without authorization, exploiting a web application, or hijacking a session.

9. The non-transitory computer readable medium as set forth in claim 7, wherein the information associated with the request comprises a time at which the request was received from the client or the historical data comprises a number of requests received from the client or a number of requests to access the resource received from the client.

10. The non-transitory computer readable medium as set forth in claim 7, wherein the first executable code, when executed by the processors, further causes the processors to:
    determine whether an Internet Protocol (IP) address of the client is included in a blacklist; and
    block the request prior to requesting the fingerprint, when the IP address of the client is included in the blacklist.

11. The non-transitory computer readable medium as set forth in claim 7, wherein the historical data is based on network traffic received from the client by two or more network devices having access to the reputation database.

12. The non-transitory computer readable medium as set forth in claim 7, wherein the first executable code, when executed by the processors, further causes the processors to, when the record of the reputation database does not match the fingerprint:
    insert a new record into the reputation database including the fingerprint;
    request additional authentication information from the client; and
    initiate the action based on a response received from the client to the request for additional authentication information.

13. A security management computing device, comprising memory comprising programmed instructions stored thereon and one or more processors configured to execute the stored programmed instructions to:
    send, prior to providing access to a client in response to a request for a resource, executable code to the client, wherein the executable code is configured to obtain information associated with the client, assemble the information into a fingerprint, and return the fingerprint in response;
    determine whether the fingerprint has been returned from the client;
    when the fingerprint has not been returned from the client, block the request;
    when the fingerprint has been returned from the client, determine whether a record of a reputation database matches the fingerprint; and
    when the record of the reputation database matches the fingerprint:
        update historical data in the record to include information associated with the request; and
        initiate an action based on the historical data or other data included in the record, the action comprising blocking the request or providing access to the resource to the client.

14. The security management computing device as set forth in claim 13, wherein the fingerprint is used to prevent an activity selected from scraping a website, initiating a denial of service (DOS) attack, repeatedly guessing authentication information, initiating a fraudulent activity, accessing a virtual private network (VPN) without authorization, exploiting a web application, or hijacking a session.

15. The security management computing device as set forth in claim 13, wherein the information associated with the request comprises a time at which the request was received from the client or the historical data comprises a number of requests received from the client or a number of requests to access the resource received from the client.

16. The security management computing device as set forth in claim 13, wherein the processors are further configured to execute the stored programmed instructions to:
    determine whether an Internet Protocol (IP) address of the client is included in a blacklist; and
    block the request prior to requesting the fingerprint, when the IP address of the client is included in the blacklist.

17. The one or more security management computing devices as set forth in claim 13, wherein the historical data is based on network traffic received from the client by two or more network devices having access to the reputation database.

18. The security management computing device as set forth in claim 13, wherein the processors are further configured to execute the stored programmed instructions to, when the record of the reputation database does not match the fingerprint:
    insert a new record into the reputation database including the fingerprint;
    request additional authentication information from the client; and
    initiate the action based on a response received from the client to the request for additional authentication information.

19. A network traffic management system comprising one or more security management computing devices, one or more server devices, and one or more client devices, the system comprising memory comprising programmed instructions stored thereon and one or more processors configured to execute the stored programmed instructions to:
    send, prior to providing access to a client to a requested resource, executable code to the client, wherein the executable code is configured to obtain information associated with the client, assemble the information into a fingerprint, and return the fingerprint in response;
    determine whether the fingerprint has been returned from the client;
    when the fingerprint has not been returned from the client, block the request;
    when the fingerprint has been returned from the client, determine whether a record of a reputation database matches the fingerprint; and
    when the record of the reputation database matches the fingerprint:
        update historical data in the record to include information associated with the request; and
        initiate an action based on the historical data or other data included in the record, the action comprising blocking the request or providing access to the resource to the client.

20. The network traffic management system of claim 19, wherein the fingerprint is used to prevent an activity selected from scraping a website, initiating a denial of service (DOS) attack, repeatedly guessing authentication information, initiating a fraudulent activity, accessing a virtual private network (VPN) without authorization, exploiting a web application, or hijacking a session.

21. The network traffic management system of claim 19, wherein the processors are further configured to execute the stored programmed instructions to:
    determine whether an Internet Protocol (IP) address of the client is included in a blacklist; and
    block the request prior to requesting the fingerprint, when the IP address of the client is included in the blacklist.

22. The network traffic management system of claim 19, wherein the historical data is based on network traffic received from the client by two or more network devices having access to the reputation database.

23. The network traffic management system of claim 19, wherein the information associated with the request comprises a time at which the request was received from the client or the historical data comprises a number of requests received from the client or a number of requests to access the resource received from the client.

24. The network traffic management system of claim 19, wherein the processors are further configured to execute the stored programmed instructions to, when the record of the reputation database does not match the fingerprint:
- insert a new record into the reputation database including the fingerprint;
- request additional authentication information from the client; and
- initiate the action based on a response received from the client to the request for additional authentication information.

* * * * *